United States Patent [19]
Osman

[11] Patent Number: 5,615,834
[45] Date of Patent: Apr. 1, 1997

[54] ULTRA THRUST REVERSER SYSTEM

[76] Inventor: Medhat A. Osman, 1416 Ridgeback Rd. #D, Chula Vista, Calif. 91910

[21] Appl. No.: 381,473

[22] Filed: Jan. 31, 1995

[51] Int. Cl.$^6$ .................................................. B64D 33/04
[52] U.S. Cl. ................................... 239/265.19; 244/110 B
[58] Field of Search .................. 244/110 B; 239/265.19, 239/265.24, 265.31, 265.27

[56] References Cited

U.S. PATENT DOCUMENTS

| | | |
|---|---|---|
| Re. 24,703 | 9/1959 | Brame . |
| 2,847,823 | 8/1958 | Brewer . |
| 3,013,751 | 12/1961 | Scott et al. . |
| 3,015,936 | 1/1962 | Brewer et al. . |
| 3,134,226 | 5/1964 | Gardiner et al. . |
| 3,237,864 | 3/1966 | Taylor et al. . |
| 3,262,269 | 7/1966 | Kutney et al. . |
| 3,434,666 | 3/1969 | Shaw . |
| 3,610,534 | 10/1971 | Medawar et al. . |
| 3,612,400 | 10/1971 | Johnson et al. . |
| 3,684,182 | 8/1978 | Maison . |
| 3,721,389 | 3/1973 | Mackinnon et al. . |
| 4,013,226 | 3/1977 | Willard . |
| 4,093,122 | 6/1978 | Linderman et al. . |
| 4,129,269 | 12/1978 | Fage . |
| 4,182,501 | 1/1980 | Fage . |
| 4,424,669 | 1/1984 | Fage ................................ 244/110 B X |
| 4,485,970 | 12/1984 | Fournier et al. . |
| 4,581,890 | 4/1986 | Giraud . |
| 4,801,112 | 1/1989 | Fournier et al. . |
| 4,865,256 | 9/1989 | Durand et al. . |
| 5,056,828 | 10/1991 | Pillari ................................ 244/110 B |
| 5,058,828 | 10/1991 | Pillari . |
| 5,176,340 | 1/1993 | Lair .................................... 244/110 B |
| 5,243,817 | 9/1993 | Matthias . |
| 5,284,015 | 2/1994 | Carimali et al. . |

Primary Examiner—Kevin Weldon
Attorney, Agent, or Firm—Sue Z. Shaper; Butler & Binion, L.L.P.

[57] ABSTRACT

A thrust reverser system for jet engine comprising a tailpipe, clamshell doors and actuators, wherein the tailpipe and clamshell doors may be corrugated, the corrugations mating, the actuators may be situated out of the external free air flow, the doors may be stowed out of contact with internal engine gas flow and that may include a tailpipe aft fairing having a movable section and a pressure booster system for the actuators.

23 Claims, 11 Drawing Sheets

ULTRA THRUST REVERSER SYSTEM

FIELD OF INVENTION

This invention relates to thrust reverser systems for aircraft jet engines. This patent relates to Applicant's Disclosure Document filed Apr. 26, 1994 on the same subject.

Thrust reverser systems are used to decelerate a jet aircraft, and in particular to slow it down after landing, to slow it down during taxiing, and to aid it to back-up from a tight spot or a gate if needed. Reversing the exhaust jet flow from the engines provides the desired deceleration, especially on short runways, and slows down the aircraft to a safe taxiing speed thereby allowing the pilot to use the brakes on the taxiways.

Previous designs such as U.S. Pat. Nos. 2,968,150 and 3,610,534, sometimes referred to as four bar designs, provide a reverser system with a continuous tailpipe that is favorable for internal engine gas flow. However, the protrusion of the actuation mechanism into the free air stream surrounding the reverser system, or engine nacelle, has the disadvantage of possibly incurring significant external drag which can penalize aircraft performance in various modes of operation.

U.S. Pat. No. 4,129,269, referred to in the industry as the single-pivot design, provides a light construction thrust reverser concept in which the doors and a reduced tailpipe form the exhaust system in forward thrust. The single-pivot design has the disadvantage of possibly permitting leakage of the internal engine gas flow between the stowed doors and the tailpipe. Exhaust flow leakage through the tailpipe can adversely impact engine thrust performance and fuel consumption.

Exhaust plumes from both of the conventional reverser designs are known to sometimes affect the aircraft control surfaces during reverse thrust operation. Both designs therefore can require additional external surfaces to be attached to the aircraft pylon or other methods to divert the plume away from such control surfaces. Those additional external surfaces, mandated by considerations of compatibility and systems integration of the reverser with the aircraft, add further cost, weight, potential drag and vibration.

The new design of the present invention deals not only with reverse thrust performance, but also with optimizing forward thrust performance during the various modes of forward flight, and especially during the cruise mode where the aircraft spends most of its flight time. The new design deals with these performance issues in a superior manner by combining lighter construction with better internal and external flow aerodynamic characteristics. The design deals effectively with aircraft/thrust reverser integration and compatibility issues, discussed above, by providing an integrated means to control the plume and divert it away from the aircraft control surfaces. In addition, the new design affords a solution to new safety requirements for bigger actuators to restow the doors in case of inadvertent deployment during flight.

The housing design, in general, for the reverser system, including the actuators and the associated operating mechanism, can adversely affect the external gas flow around the tailpipe causing external drag (due to the protrusion of reverser mechanisms in the free air stream around the nacelle thereby causing excessive drag during flight as in the case of the conventional four bar design.) The new inventive housing design disclosed herein benefits from the fact that its housing not only affords no leakage path in the internal gas flow, but also that its housing does not protrude into the free air stream around the nacelle. Conventional single pivot reverser designs have the potential for significant flow leakage between such doors and the rest of the tailpipe. This defect is compounded by a further inability of that design to control the tailpipe exit area which adversely affects forward thrust. These two defects of this particular conventional housing design severely affect the engine's fuel consumption and performance, penalizing the aircraft's overall performance and range. On the other hand, excessive drag during flight incurred by the other conventional four bar housing design also penalizes the aircraft's overall performance and range. This drag is eliminated by the new inventive housing.

Conventional construction techniques for target type thrust reverser components, single pivot or four bar, rely heavily on riveting together individual details and subassemblies of hardware, such as frames, inner skin, outer skin and other detail parts. A multitude of pieces of hardware and the extensive use of riveting increases the system weight as well as development, tooling and manufacturing costs. These aspects of design are adversely reflected in the aircraft's gross weight, payload, performance and cost of operation. The present invention discloses a lighter construction design, including an integral exhaust tailpipe and integral clamshell door construction, actuators and control systems. Integral construction of the tailpipe and doors provides a lighter, stronger structural system compared to conventional construction methods which are heavier, and labor intensive. The new system requires less investment in tooling. The incorporation of the side fairings into the doors of the new design improves aerodynamic performance, reduces gaps, and contributes to the reduction of external drag characteristics for better fuel consumption and enhances the overall aircraft/engine performance. The new design in addition solves the requirement for increased restow force to handle inadvertent deployment during cruise conditions, which can lead to asymmetric thrust on the aircraft and be catastrophic.

SUMMARY OF THE INVENTION

The invention comprises a thrust reverser system for jet engines. The system includes a tailpipe and attached clamshell doors and actuators, including linkage, for moving the doors. The actuators and linkage attach between the tailpipe and the doors and move the doors between a stowed position, out of contact with the internal engine gas flow, to a deployed position, diverting internal engine gas flow aft of the tailpipe.

In the preferred embodiments the actuators are housed together with the tailpipe and doors to form a protrusion free surface for external free air flow over the thrust reverser system area or nacelle.

The actuators may be connected to a pressure booster system to minimize their size.

In preferred embodiments the tailpipe comprises a corrugated body. These body corrugations include annularly structured ridges or hats and axially structured depressions or blisters formed with or in the tailpipe skin. Preferably, the actuators attach to the tailpipe so as to be located in the axial body depressions, and portions of the actuator linkage attach to annular ridge corrugations of the tailpipe body. Acoustical material may be attached over the surface of the tailpipe.

In preferred embodiments the clamshell doors also have a corrugated body, comprising a smooth outer skin bonded to a corrugated inner skin. In the preferred embodiments the clamshell doors form a pair of semi-circular doors. One door, in addition, may include a body extension, or fairing, in the circumferential direction, creating a greater than semi-circular door. Such a door body extension would underlie a portion of the second door in the stowed position.

The thrust reverser system may include an aft fairing attached to the tailpipe, a portion of which may be movable from a stowed position out of contact with the flow of the internal engine gas to a deployed position extending rearward of the tailpipe to further guide internal engine gas flow aft of the tailpipe. Preferably, the movable portion of the aft fairing would comprise two annular sections. Actuators could move these movable portions.

BRIEF DESCRIPTION OF THE DRAWINGS

A better understanding of the present invention can be obtained from the detailed description of exemplary embodiments set forth below, to be considered in conjunction with the attached drawings, in which:

FIGS. 7, 3b and 10 illustrate side plan and detail views, respectively, of a tailpipe including cross section details of an attachment point for connecting a link to the tailpipe.

FIG. 12 illustrates a side plan view of the upper and lower doors over the tailpipe, which doors constitute the outer surface of the nacelle surface in the stowed position, with the deployed position indicated in dashed lines, and including aft fairings for the tailpipe; FIG. 12 also indicates the corrugating mating door and integral hat sections with an integral end kicker plate arrangement as well as integral door frames.

DETAILED DESCRIPTION OF PREFERRED EMBODIMENT

Figure 1:
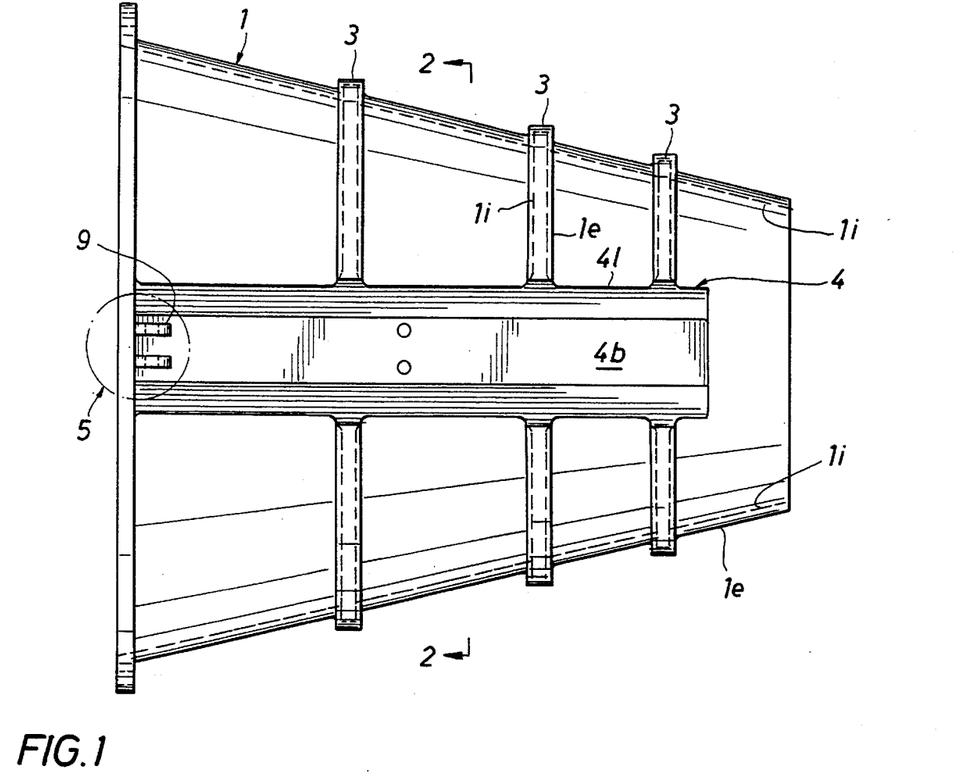
FIGS. 1 and 2 illustrate, by side plan and cross section views, respectively, an integral tailpipe construction, wherein three integral annular corrugated hat or rib sections are shown as providing structural integrity, and one axial depression is indicated with attachment points for the actuators.
Figure 2:
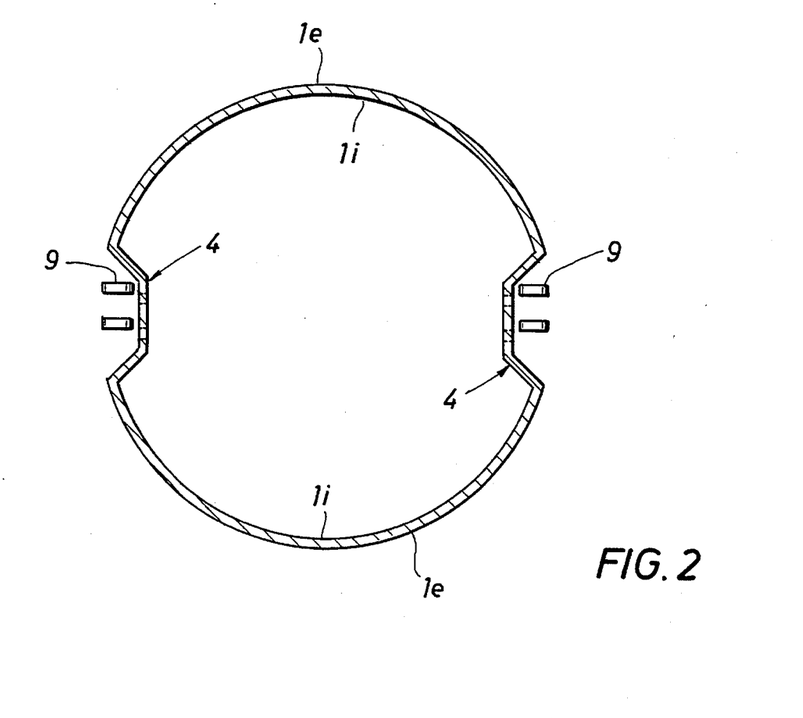

The innovative design concepts included in preferred embodiments of the thrust reverser system include an integrally constructed exhaust tailpipe best illustrated in FIG. 1E. The integrally constructed corrugated exhaust tailpipe 1 acts as the main structure carrying the various thrust reverser system components and loads. The thrust reverser loads (in reverse mode) are transmitted through the tailpipe 1 to an engine bulkhead (not shown), to be bolted to a tailpipe attachment flange 2.

As illustrated in FIGS. 1–11, the integral corrugated construction of tailpipe 1 includes hats or ridges 3, which comprise annular corrugations sometimes referred to as ribs, and internal axial blisters or depressions 4, located on each side of tailpipe 1. This integral corrugated design permits the tailpipe itself to transmit reverse thrusting loads, in lieu of requiring separate frames to be riveted to the tailpipe skin. The integral ridges and blisters form a cage-like frame upon the skin of the tailpipe itself. This integral construction technique significantly reduces the manufacturing time and cost and results in a lighter and stronger tailpipe. The hat or rib sections 3 act as the traditional Z or L-sections, but providing twice as much rigidity as traditional Z or L-sections without incurring the weight penalty.

Figure 3:
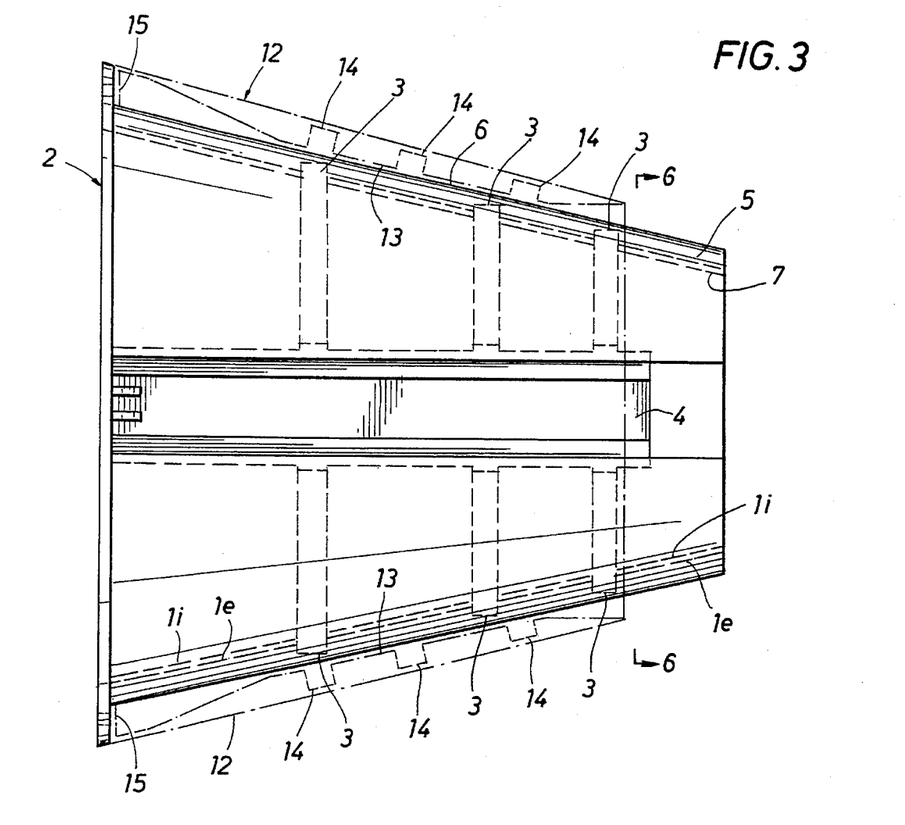
FIGS. 3 and 6 illustrate, by side plan view and cross section, a tailpipe design (with stowed doors indicated in dashed line in the former), the design making provision for an acoustic treatment of the tailpipe.
Figures 4, 6:
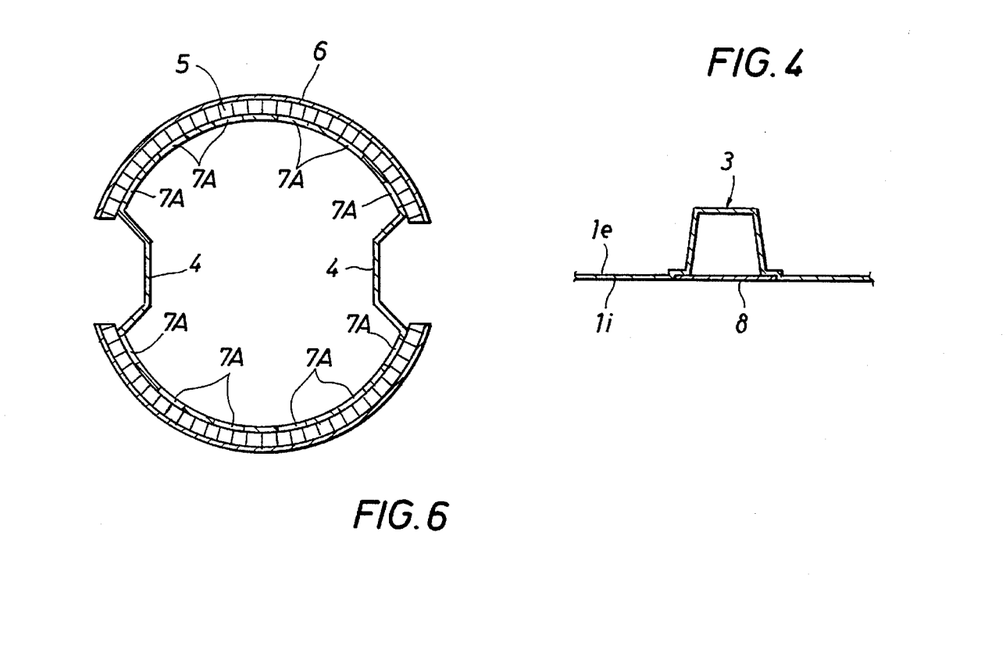
FIG. 4 illustrates by a detail drawings an option of covering an interior base of a corrugated hat section of the tailpipe (or the door) with a strip of material.
Figure 5:
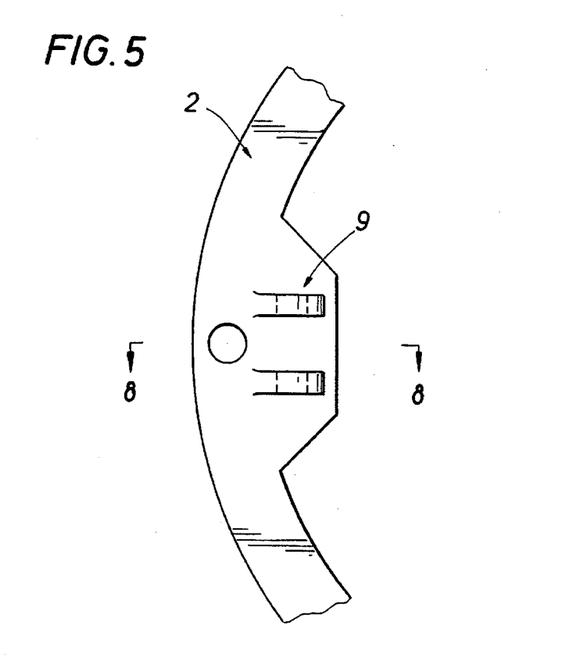
FIGS. 9, 5 and 8 illustrate an end view of the tailpipe, forward looking aft, indicating the axial depressions that forms the internal blisters to house the actuators, as well as details of the actuator forward mounts on both sides of the tailpipe flange, respectively.

If acoustic attenuation is needed, as illustrated in the preferred embodiment in FIG. 3, especially for turbojet or low bypass applications, a similar tailpipe design can be utilized where a bonded honeycomb 5, or whatever sound attenuation material is desired, can be sandwiched between a smooth tailpipe outer skin 6 and an inner corrugated tailpipe perforated skin 7, having an inside surface 1i and an outside surface 1e. Skin 7 maintains the integrally constructed corrugated tailpipe structure of the tailpipe of FIG. 1. Skins 6 and 7 and the sound attenuation material 5 are to be sandwiched and attached together using an appropriate attachment process, depending on the materials used for construction. The hat section areas 3 of skin 7 and the axial depressions 4, would not have any perforations 7A, to enhance structural integrity. Other configurations could be made where the corrugations could be in the outer skin 6 which is attached or fastened to the inner skin 7, enclosing the sound attenuation material between them as before.

A strip of metal 8, or any other compatible material depending on the material used for construction, could be attached to the inside surface 1i of tailpipe 1, under hat sections 3, in areas exposed to internal flow to enhance internal gas flow characteristics and increase rigidity, if needed. See FIG. 5.

The tailpipe surface in the internal gas flow path area will be generally smooth and continuous, except for the base areas of hat sections 3, which are essentially insignificant. Importantly, the contact surface for the internal gas flow through the reverse thruster system is comprised of the unitary tailpipe 1 itself and thus does not allow for any leakage or interruption of the exhaust gas flow, which in turn requires elaborate sealing designs and still results in exhaust flow leakage of several percent with time and stack-up of hardware tolerances. This gas flow leakage from the tailpipe is a major contributor to the deterioration of the overall aircraft/engine system performance, reflected in an increase in fuel consumption and a decrease in range.

Figure 7:
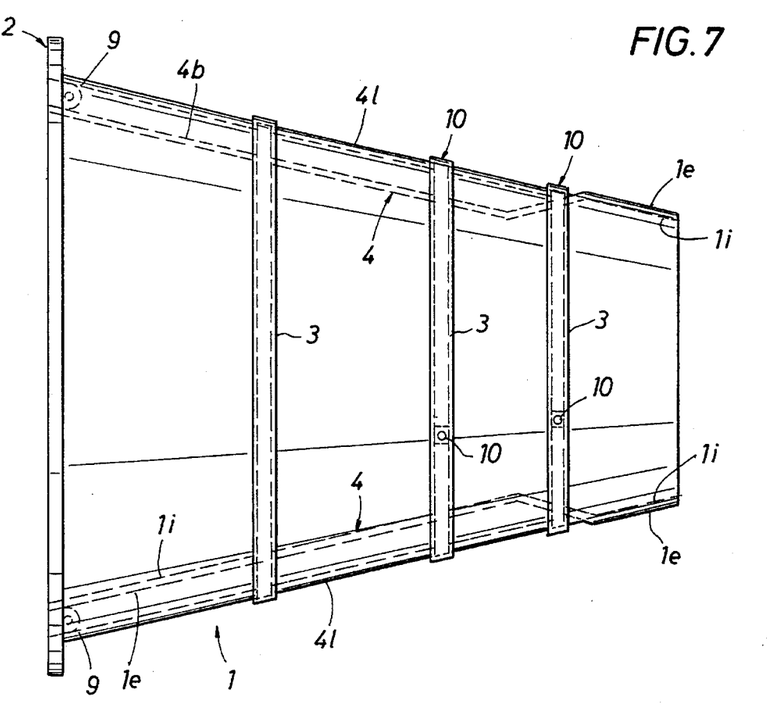
Figure 8:
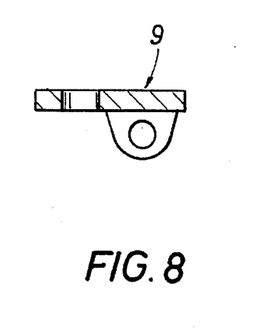

Tailpipe attachment flange 2, FIG. 1, includes attachment points 9 for the actuators 18. FIG. 7 illustrates in plan view tailpipe 1 wherein the actuator link assembly pivots at point 10 located on the tailpipe integral frame hat section 3. Four link attachment pivot points 10 on the tailpipe are shown. These pivot points connect the doors to the tailpipe frame through links or connecting rods 16.

Figure 10:
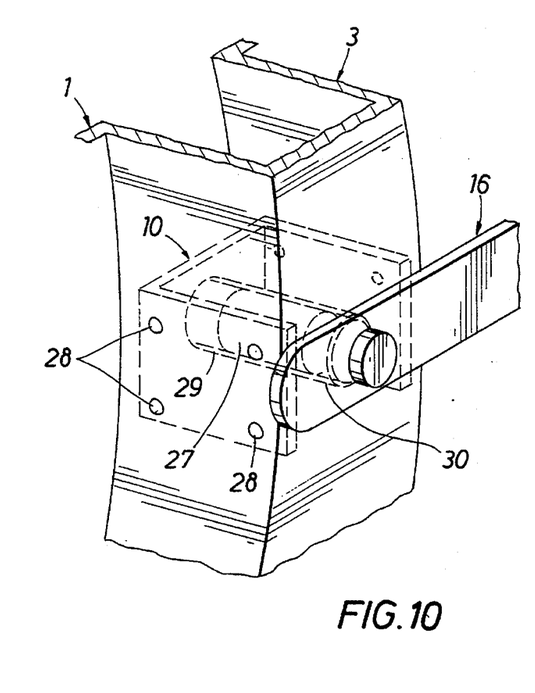
Figure 11:
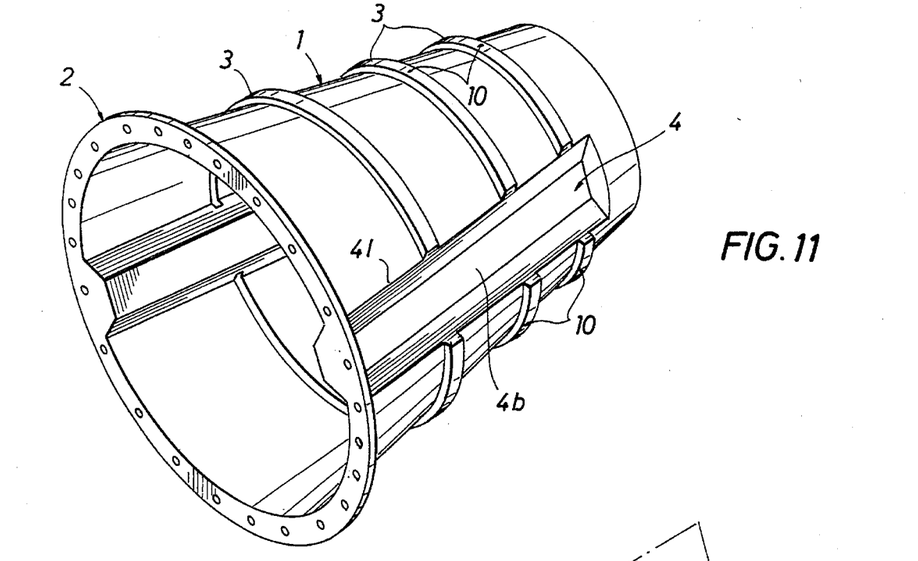
FIG. 11 illustrates in perspective a tailpipe.
Figure 30:
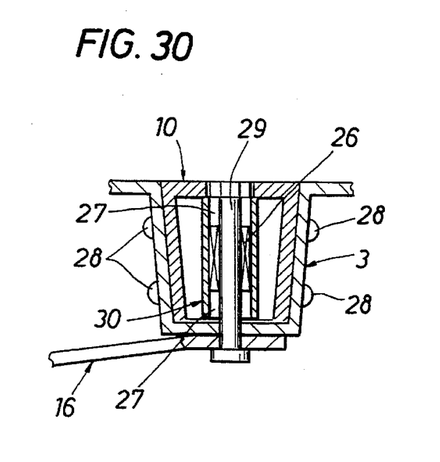

Pivot point 10 is more clearly illustrated in detail in FIGS. 30 and 10. Connecting link 16 attaches to pivot 29 having cylindrical housing 30 for bearing 26, and including packing 27. Housing assembly 10 attaches to hat section 3 by attachment means 28.

Figure 9:
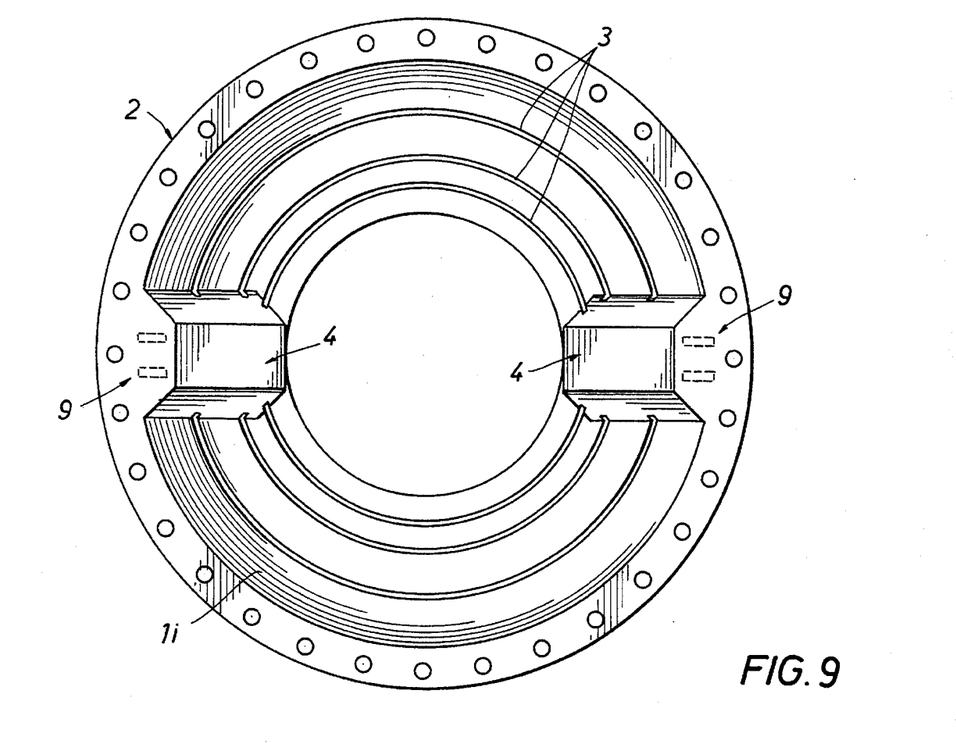

FIG. 9 shows an end view of tailpipe 1, forward looking aft through the tailpipe. Attachment flange 2 having actuator attachment points 9 is illustrated and more particularly detailed in FIGS. 8 and 5.

FIGS. 12–19 and FIGS. 20 and 21 illustrate a preferred embodiment for the integral construction of semi-circular clamshell doors 11. The doors consist of an outer skin 12 and an inner skin 13 that can withstand heat. The inner skin 13 preferably has integral frame corrugations 14, comprising two, three or more circular ribs or hats, depending on the loads and the door size. Such design replaces the conventional separate frame construction where structural support usually is riveted between outer and inner skins. The elimination of the conventional frame support results in the elimination of more than half the number of rivets. The present design teaches the direct attachment of the inner skin 13 and outer skin 12, such as at the trough of the hat sections 14, using appropriate attachment and bonding processes. This reduces weight and manufacturing costs significantly. Again, a strip of material could be attached to the base of the annular channel 14 sections on the interior of the doors, similar to that disclosed in FIG. 3, in the areas exposed to reverse thrust flow to enhance flow characteristics and increase rigidity, if desired.

In a preferred design, inner skin 13 includes an annular kicker end plate 15, located at the forward end of each door (when stowed), to further divert the reversed flow of gases in the reverse mode.

Figure 26:
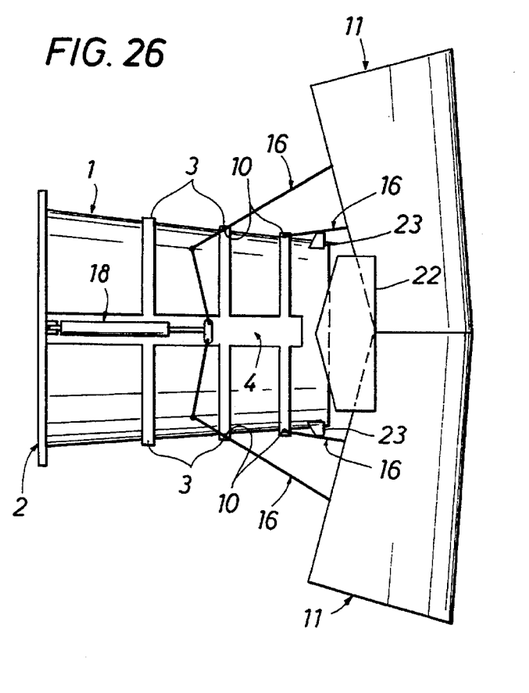
FIGS. 26 and 27 illustrate the reverser system in deployment position with the general arrangement of the actuator, the connecting links, the fixed and movable fairings and the tailpipe, a side view and an end view, forward looking aft.
Figure 27:
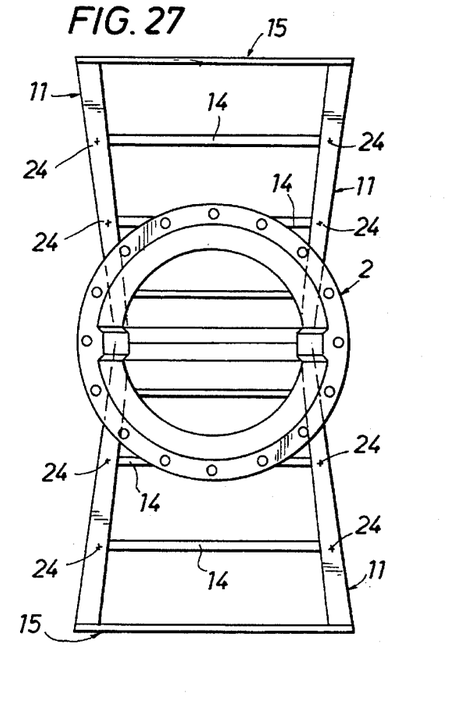
Figure 28:
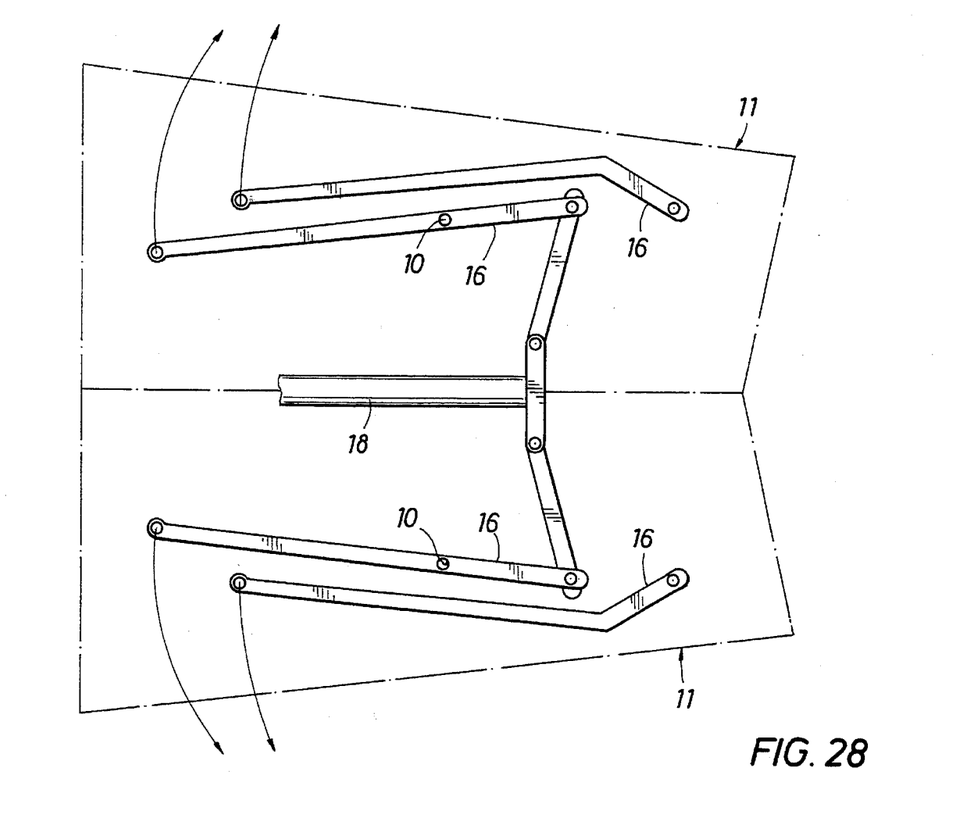
FIG. 28 shows the general arrangement of the actuation system, links and hydraulic actuator with the doors represented in dashed lines. The arrows show the direction of rotation and translation of the doors. Stow is in reverse direction.
Figure 29:
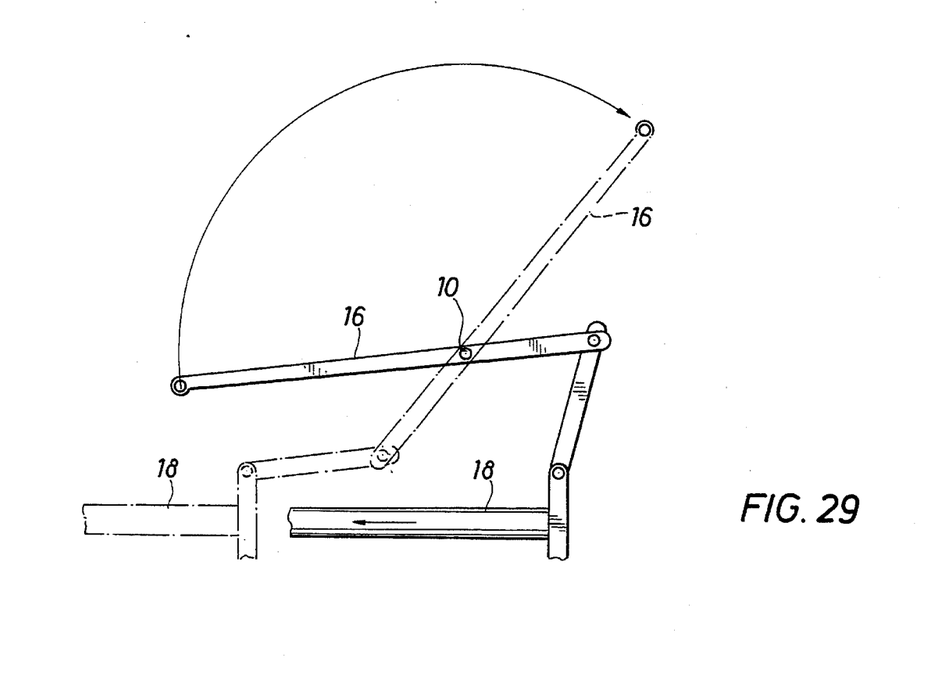
FIG. 29 shows the motion of the driver link, which is connected to the actuator, to the deploy position. Stow is in reverse direction.

Four connecting rods, or links, 16 connect each door 11 to actuators 18 and tailpipe 1, illustrated in FIG. 26. The links are shown connected to the doors using four fittings 24 bolted to portions of the inner door skin 13, as shown more particularly in FIG. 16 and 17.

Figures 15, 16, 17:
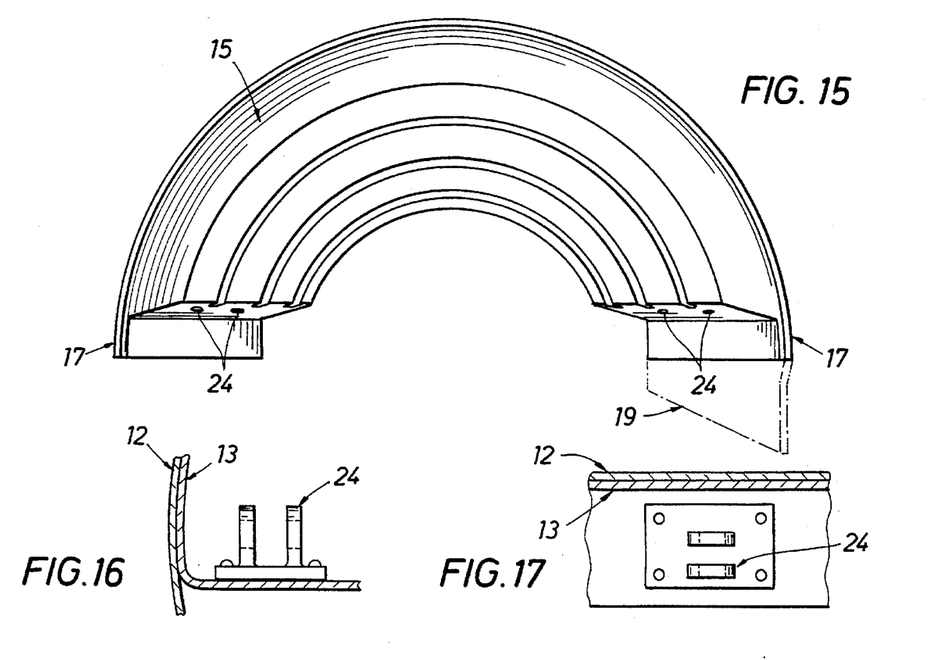
FIG. 15 illustrates in end view a door indicating attachment points for the links and a side fairing combined with the door skin.
FIGS. 16 and 17 illustrate details of the attachment point.
Figure 18:
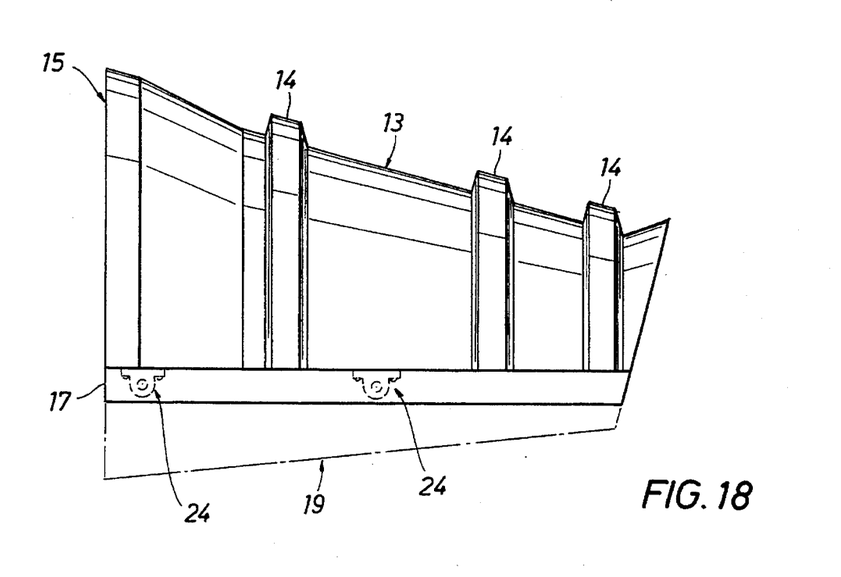
FIG. 18 illustrates in side plan view the inner skin of the door, showing the integral frame sections, the end plate, the attachment fittings and indicating the underlap feature.
Figure 19:
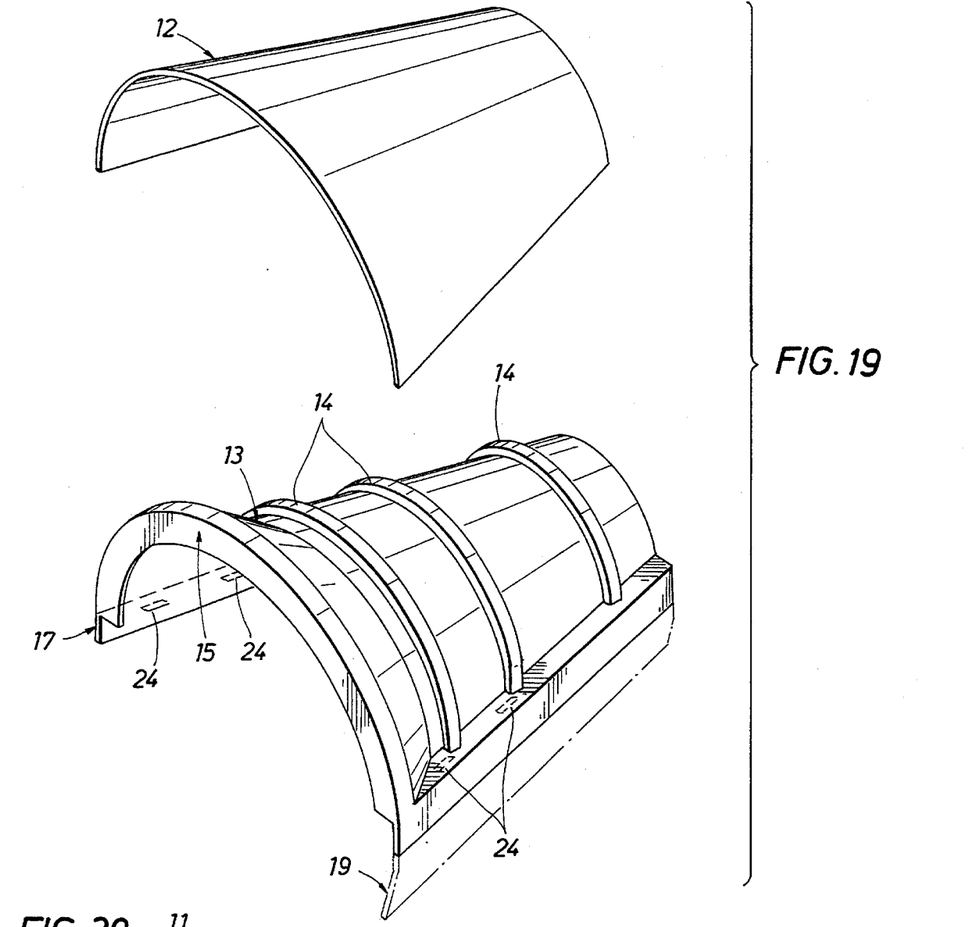
FIG. 19 illustrates a door inner and outer skin in perspective.
Figure 20:
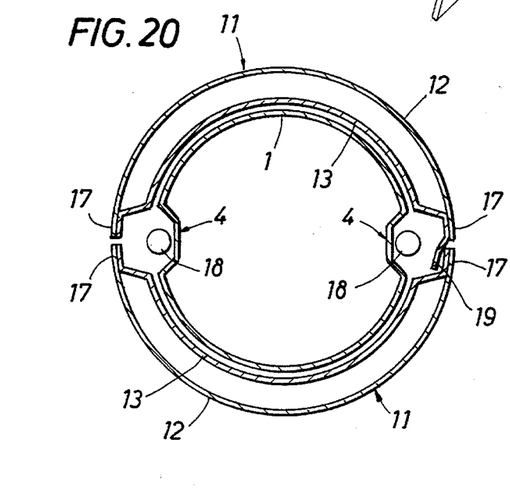
FIGS. 20 and 21 show cross-sections of a door and tailpipe, not at a hat or rib and at a hat or rib, respectively, illustrating the integral fairings arrangement, the underlap extension concept, the actuators position and the internal tailpipe blisters.
Figure 21:
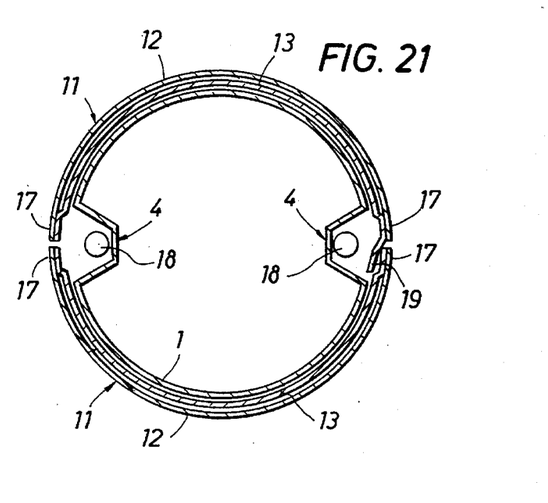

A further innovative idea, illustrated in FIG. 15, 18 and 19 is the elimination of conventional fairings on the sides of the thrust reverser and incorporating those fairings into the integral construction of the doors 11. Current designs use different shapes of fairings to cover the actuators and actuation mechanism on the side of the tailpipe, and in addition provide for the protrusion of the fairings into the free air stream. The elimination of separate individual fairings is achieved by extending the upper and lower doors' outer and inner skins, referred to in combination as element 17, to form semi-circular doors and cover actuators 18, as shown also in FIGS. 20 and 21. An important further benefit of this idea is providing extensions 17 on the doors as an additional barrier between the reversed internal engine gases and the aircraft surface to control and contain the reverse flow plume and keep it away from aircraft control surfaces. This will also help keep the flow attached to the doors for an extended period of time in the deployed position to further guide the flow forward to achieve the desired reverse thrust. This approach eliminates the cost of the fabrication and tooling of the conventional fairings and decreases gaps between doors and fairings significantly, which gaps have the potential to cause aerodynamic losses. The incorporation of the conventional fairings into the door construction also saves the weight and cost of the fairings attachment to the structure.

Another innovative idea illustrated in the preferred embodiment in FIGS. 15, 18, 19, 20 and 21 is extension 19 of the inboard and/or outboard side of either an upper and/or lower door. Such extension 19 would be used, as systems integration and compatibility demands, to further divert the exhaust plume in reverse away from the aircraft surface to enhance its stability on the ground during reverse thrust operation. The extension 19 is shown designed to underlap the edge of the other door in the stowed position, FIGS. 20 and 21, adjacent the actuators 18 received in the tailpipe 1 blisters 4.

Figures 22, 23, 24:
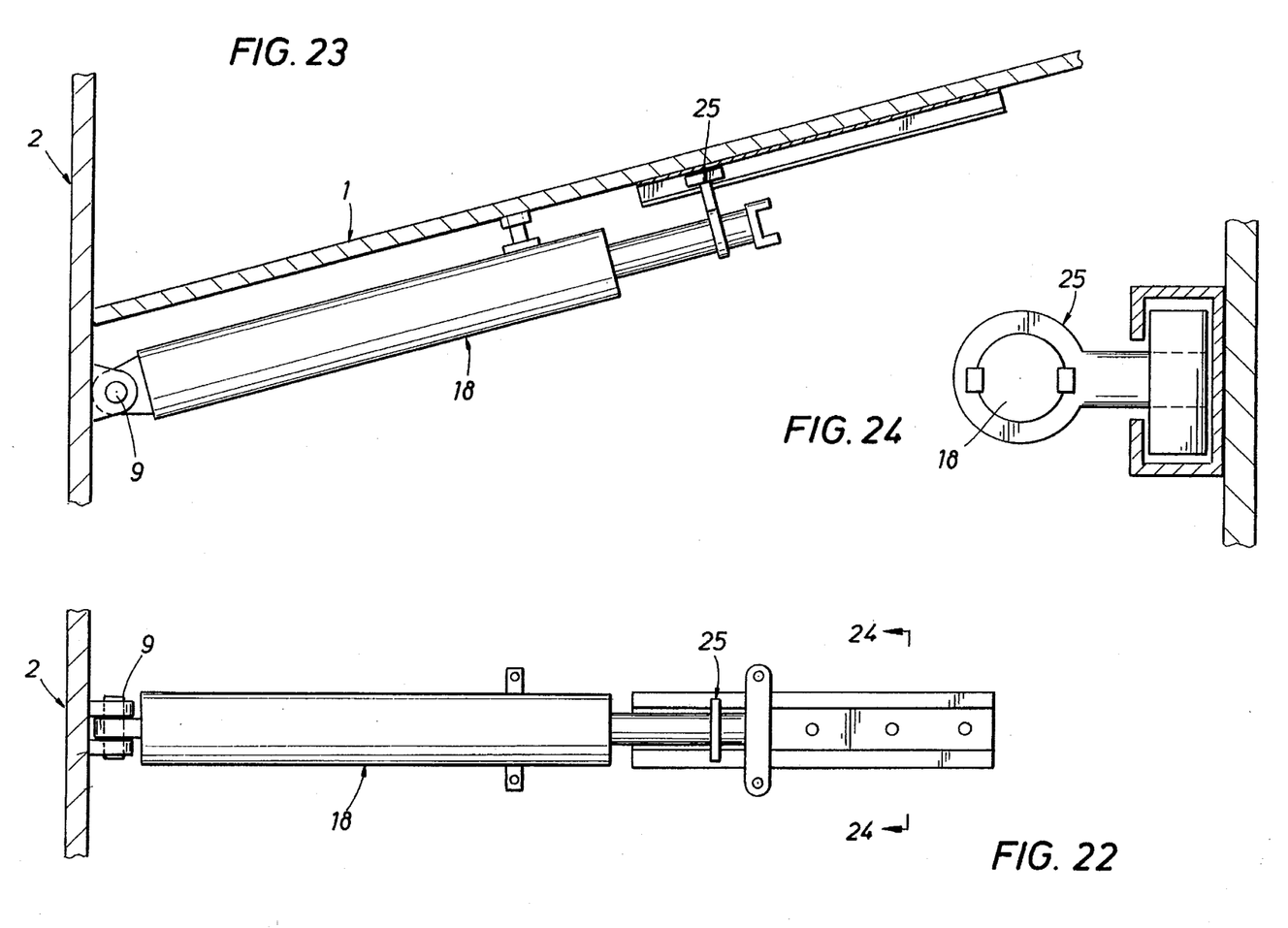
FIGS. 22, 23 and 24 illustrate the actuator system, its attachment to the tailpipe and an actuator piston anti-rotation arrangement.
Figure 25:
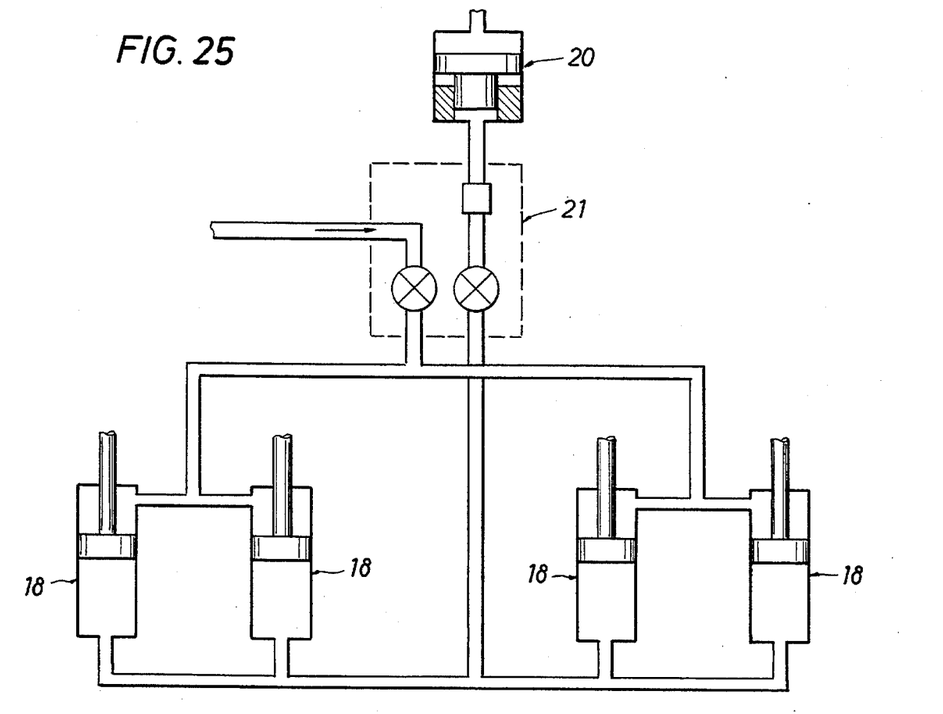
FIG. 25 illustrates a hydraulic system with an intensifier for supplying high pressure hydraulic fluid to the actuators for each thrust reverser; the illustration assumes a two engine configuration, with two actuators per engine, each actuator having two ports, one for deployment and the other for stow operations, and where hydraulic and electric controls for sequence of deployment and restow have been simplified, for discussion purposes, since they are similar to current designs and practices mandated by the airworthiness regulations for safe operation of thrust reverser systems.

A further innovative idea of the system comprises the use of a pressure booster 20 for the reverser actuators 18, schematically shown in FIGS. 22 and 25. Customarily, hydraulic or pneumatic pressures are used to actuate thrust reverser systems. The idea of boosting pressure could be applied to any type of working fluid. For discussion purposes, the case of hydraulic fluid is used. A hydraulic pressure booster 20 could be installed internally in any section of the aircraft to increase the hydraulic pressure from the aircraft supply, which is usually at 1500–3000 psi. The hydraulic pressure supply to the thrust reverser actuators can be boosted up to 8000 psi or beyond as the technology advances and as sealing technology permits, to meet the most critical reverser need which is usually a restow due to an inadvertent deployment during flight, or as specified by the design or certification requirements. As certification requirements become more stringent and require the ability to restow at increasingly higher speeds, the actuators will tend to become bigger and take more space in the nacelle. This booster approach reduces the necessary size of the hydraulic actuators to be located in the blisters 4 on each side of the tailpipe, which in turn allows each actuator to be housed in a smaller internal tailpipe blister 4 area, thereby minimizing impact on the internal gas flow, as well as not protruding in the free stream. This approach contributes to the optimization of the overall aerodynamic performance of the thrust reverser system due to the significant reduction of various types of drag (friction, base drag, interference drag). Another benefit of using a hydraulic pressure booster is the ability to maintain commonality of actuator sizes, regardless of the aircraft hydraulic pressure supply, while compensating for the aircraft hydraulic pressure supply in the booster design. This system allows using the same reverser and actuators for several aircraft applications in which each aircraft may have a different hydraulic pressure supply rating, hence allowing the same design to lend itself to multiple applications. The booster will be sized to meet the specific restow requirements which are primarily a function of the doors area and loads.

Figure 12:
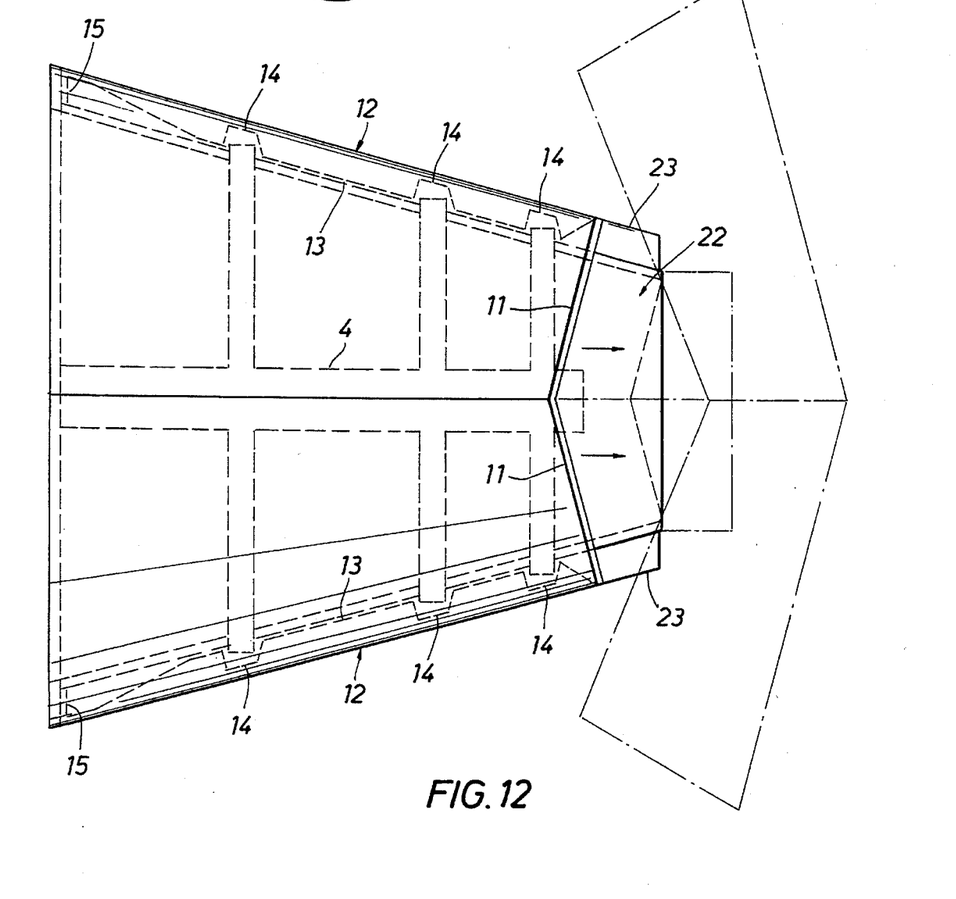
Figure 13:
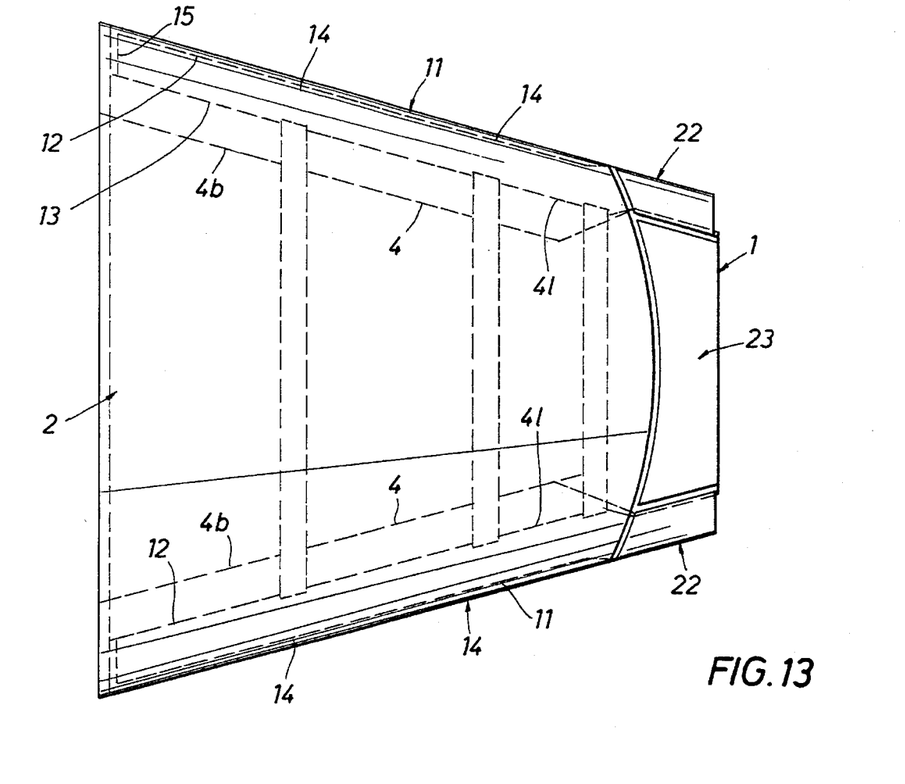
FIG. 13 illustrates in plan view the doors overlying the tailpipe and fixed and moveable aft fairings, with an indication of the internal blisters that house the actuators.
Figure 14:
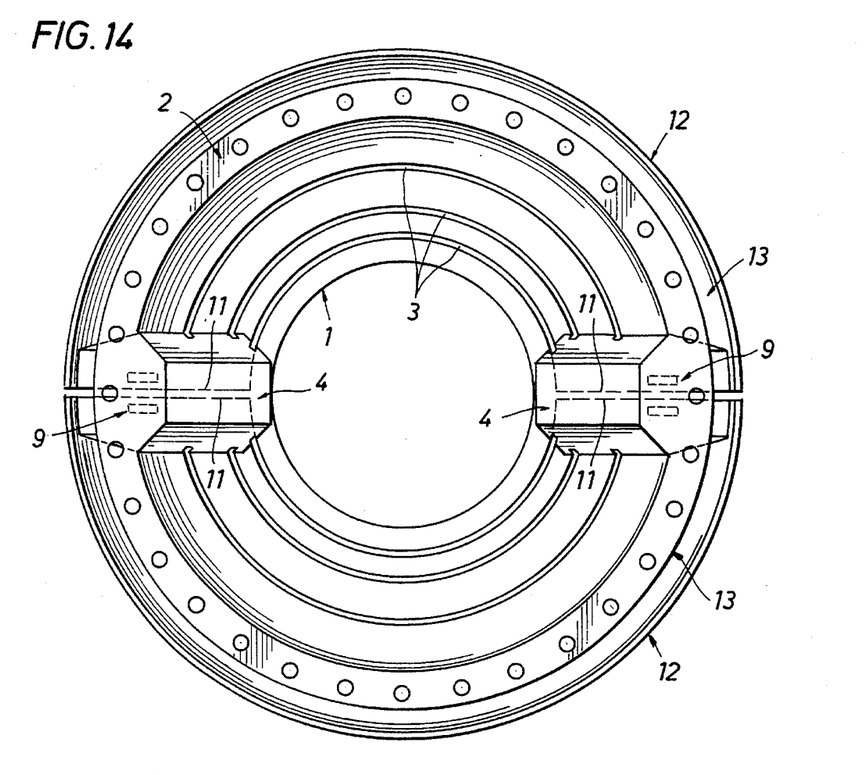
FIG. 14 illustrates an end view of the doors over the tailpipe, forward looking aft into the tailpipe, indicating in particular a cavity formed between the door edges over the tailpipe internal blisters for housing an actuator on each side of the tailpipe.

A further innovative idea of the present design, illustrated in FIGS. 12 and 26, is the sliding rearward of a portion 22 of an aft fairing attached to tailpipe 1, preferably one movable portion located on each side of the tailpipe. The driving force may either be through mechanical linkages, or actuated electrically, pneumatically or hydraulically during a deployment cycle. The remainder immobile portion 23 of the aft fairing would be attached to the tailpipe to maintain the external contour line during forward flight mode. Movable aft fairings, 22 as a tailpipe extension, may be spring loaded to keep them retracted during forward thrust and to maintain the external contour lines. The movable aft fairings 22 would move rearward, when needed, to close the small gap between the tailpipe exit plume and the clamshell doors in the deployed, reverse thrust position. This feature keeps the reverse flow enclosed between the deployed doors and the tailpipe to direct the reverse flow along the door's inner walls and forward to achieve the desired reverse thrust and deceleration. The fairings 22 would be in contact with the relatively cooler and higher pressure by-pass flow; therefore, they could be made out of aluminum, for example.

A pocket of extremely high turbulence flow is generated in the vicinity where both doors meet at the end of the deployment stroke for target type reversers. The turbulence is the result of the interaction between the hot gases flowing from the tailpipe rearward and the reverse flow gases rebounding from the inner doors surface. Another benefit of a movable aft fairing portion 22 is using it for alleviation and control of the effect of this highly turbulent flow by controlling the gap between the sliding aft fairing and the doors. It could be set, during flow test, to allow some of the highly turbulent gases to escape to improve the flow characteristics of the rest of the gases along the doors to provide the reverse flow action. The released gases are insignificant, but could have a favorable impact on reverse thrust performance and efficiency. Reverse thrust efficiency translates into less power from the engine during reverse thrust mode, which can lead to a reduction in the engines' cycle count, extension of the time between engine overhauls and extension of engine components service life due to reduction in accrued operating cycles. The gases would not be allowed to impinge on any of the aircraft control surfaces or critical areas.

In operation, the reverse thrust action aims at slowing down the aircraft after landing or is used for backing up and braking action during taxiing operations. When reverse thrust is commanded, the clamshell doors 11 will be pushed rearward by the actuators, through a connecting linking mechanism, to a position aft of the exhaust tailpipe exit area to divert the exhaust flow of the internal engine forward to slow down the aircraft from its landing speed, down to a manageable taxiing speed.

In the preferred design, the force resulting from the exhaust flow impingement on the doors will be absorbed by the links which in turn transfer the loads onto the tailpipe integral frame, skin and blisters structure, which transfers the load to the engine or nacelle bulkhead through a bolted flange. Part of the load could also be imparted by the hydraulic actuator body bolted to the flange, thereby creating a redundant load path providing a fail safe design approach.

Boosted hydraulic pressure supply to the thrust reverser actuators would result in the reduction of their respective diameters, thereby minimizing the impact of the tailpipe internal blister housing the actuator system on the internal engine exhaust gas flow path. Even with conventional designs, smaller actuators would help eliminate the need for external blisters protruding in the free air stream. Fairing protrusion in the free air stream to cover the actuation system results in external drag increase leading to a several percent increase in SFC during normal cruise.

The elimination of the separate side fairings achieved by extending the doors to cover the actuation system also helps enclose the jet flow within the door during reverse mode and prevent it from escaping towards aircraft control surfaces. The elimination of the separate side fairings also helps eliminate any need to have external provisions in the free stream to divert any escaped plume away from the aircraft control surfaces.

The foregoing disclosure and description of the invention are illustrative and explanatory thereof, and various changes in the size, shape, and materials, as well as in the details of the illustrated system may be made without departing from the spirit of the invention.

What is claimed is:

1. A thrust reverser system for a jet engine, comprising:

a tailpipe;

clamshell doors movable between a stowed position fully encircling said tailpipe in combination out of contact with internal gas flow, and a deployed position, diverting internal gas flow aft of the tailpipe; and actuators, including linkage, attached between the tailpipe and the doors for moving the doors, the actuators being structured together with the tailpipe and the doors such that, in stowed position, the actuators are covered by said doors and offer a protrusion-free surface for external air flow over the nacelle.

2. The apparatus of claim 1 wherein the actuators are connected to a pressure booster system.

3. A thrust reverser system for a jet engine, comprising:

a tailpipe having an integrally corrugated body comprising corrugations formed monolithically with the tailpipe skin;

clamshell doors moveable between a stowed position, out of contact with internal gas flow, and a deployed position, diverting internal gas flow aft of the tailpipe; and actuators, including linkage, attached between the tailpipe and the doors for moving the doors.

4. The apparatus of claim 3 wherein the tailpipe body corrugations comprise annular ridges and axial depressions formed with a tailpipe skin.

5. The apparatus of claim 4 wherein the actuators are situated within tailpipe body depressions.

6. The apparatus of claim 3 wherein the actuator linkage attaches to corrugations in the tailpipe body.

7. The apparatus of claim 4 wherein the actuator linkage attaches to tailpipe ridges.

8. The apparatus of claim 3 wherein the actuators are structured together with the tailpipe and the doors to offer a protrusion free surface for external air flow over the nacelle.

9. The apparatus of claim 3 that includes acoustical material attached to a surface of the tailpipe.

10. A thrust reverser system for a jet engine comprising:

a tailpipe;

clamshell doors having a corrugated body comprising a smooth outer skin bonded to an integrally corrugated inner skin, said corrugations formed monolithically with the inner skin, the doors being moveable between a stowed position out of contact with internal gas flow and a deployed position diverting internal gas flow aft of the tailpipe; and actuators for moving the doors, including linkage, attached between the tailpipe and the doors.

11. The apparatus of claim 10 wherein the door body includes a smooth outer skin bonded to a corrugated inner skin.

12. The apparatus of claim 10 wherein the clamshell door corrugated body skin includes annular ridge depressions.

13. The apparatus of claim 10 wherein the clamshell doors comprise a pair of semi-circular doors.

14. The apparatus of claim 10 wherein one door includes a body extension in a circumferential direction to create a greater than semi-circular door.

15. The apparatus of 14 wherein the door body extension underlies a portion of the second door in the stowed door position.

16. The apparatus of claim 4 wherein the clamshell doors include a corrugated inner skin that mates with the annular ridges of the tailpipe.

17. A thrust reverser system for a jet engine comprising:

a tailpipe;

clamshell doors moveable between a stowed position out of contact with internal gas flow, and a deployed position, diverting internal engine gas flow of the tailpipe;

actuators, including linkage, attached between the tailpipe and the doors for moving the doors; and an aft fairing attached to the tailpipe, a portion moving from a stowed position, out of contact with the internal gas flow, to a deployed position extending rearward of the tailpipe wherein the fairing portion guides internal gas flow aft of the tailpipe.

18. The apparatus of claim 17 wherein the movable portion of the aft fairing comprises two annular sections.

19. The apparatus of claim 17 wherein the movable portion is moved by the actuators.

20. A thrust reverser system for a jet engine comprising:

a tailpipe;

a pair of clamshell doors movable between a stowed position and a deployed position diverting internal gas flow aft of the tailpipe, the doors comprising integrated side fairings and wherein a portion of a first door fairing underlies a portion of a second door fairing in the stowed position; and actuators, including linkage, attached between the tailpipe and the doors for moving the doors.

21. A thrust reverser system for a jet engine comprising:

a tailpipe;

a pair of semi-circular clamshell doors moveable between a stowed position and a deployed position diverting internal gas flow aft of the tailpipe; and actuators, including linkage, attached between the tailpipe and the doors for moving the doors, said actuators being attached such that said actuators are covered by said doors in a stowed position.

22. A thrust reverser system for a jet engine comprising:

a tailpipe;

clamshell doors movable between a stowed position and a deployed position diverting internal gas flow aft of the tailpipe;

actuators, including linkage, attached between the tailpipe and the doors for moving the doors; and wherein a stowed door provides a fairing cover for an actuator.

23. The apparatus of claim 22 that includes a pair of clamshell doors, a pair of actuators and wherein each clamshell door provides a fairing for each actuator.

* * * * *